April 7, 1936.                    A. R. MUIRHEAD                    2,036,534
                              COTTON HANDLING APPARATUS
                                 Filed Oct. 8, 1930                3 Sheets-Sheet 1
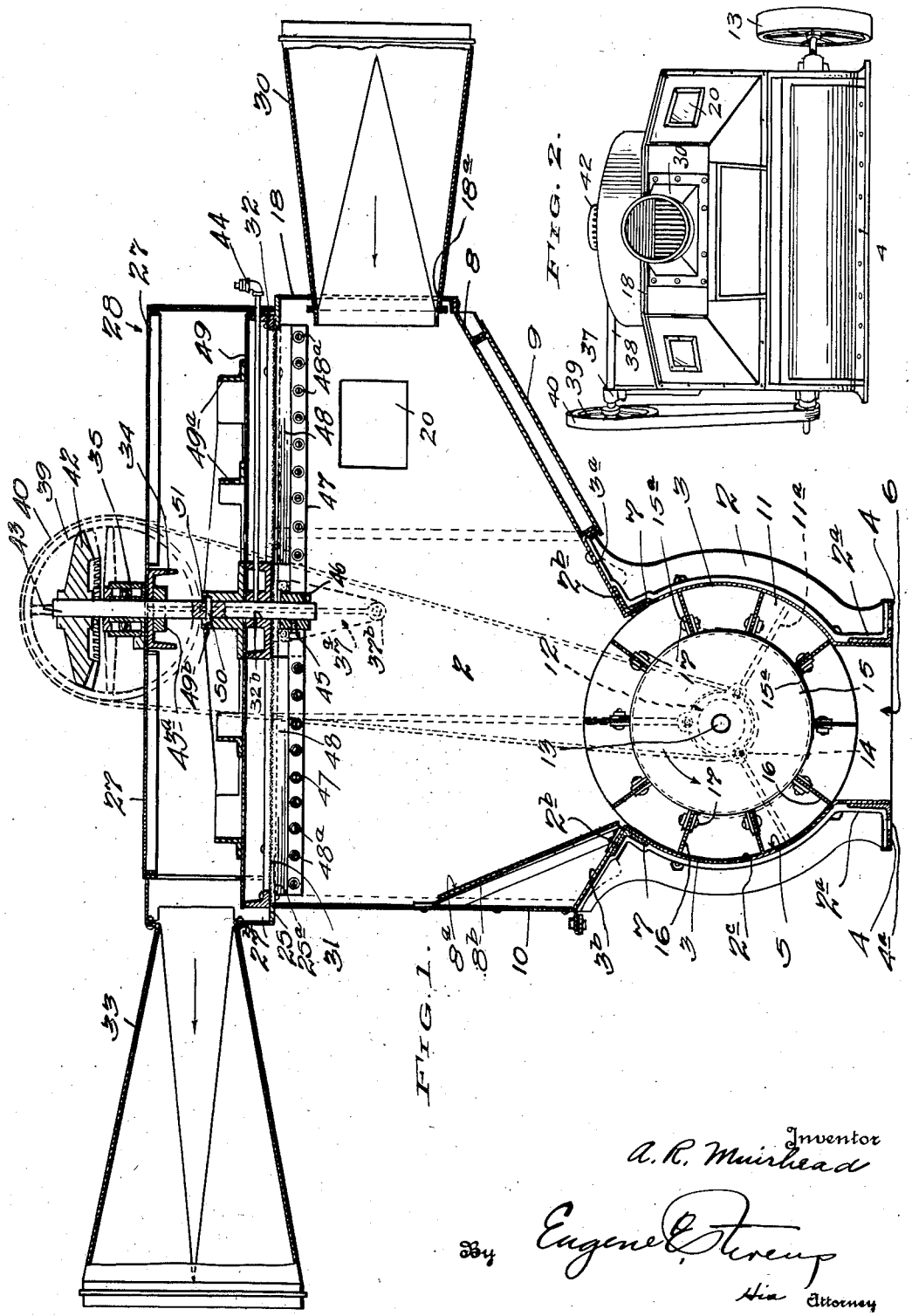
Inventor
A. R. Muirhead
By Eugene E. Stevens
His Attorney April 7, 1936.  A. R. MUIRHEAD  2,036,534
COTTON HANDLING APPARATUS
Filed Oct. 8, 1930  3 Sheets-Sheet 2
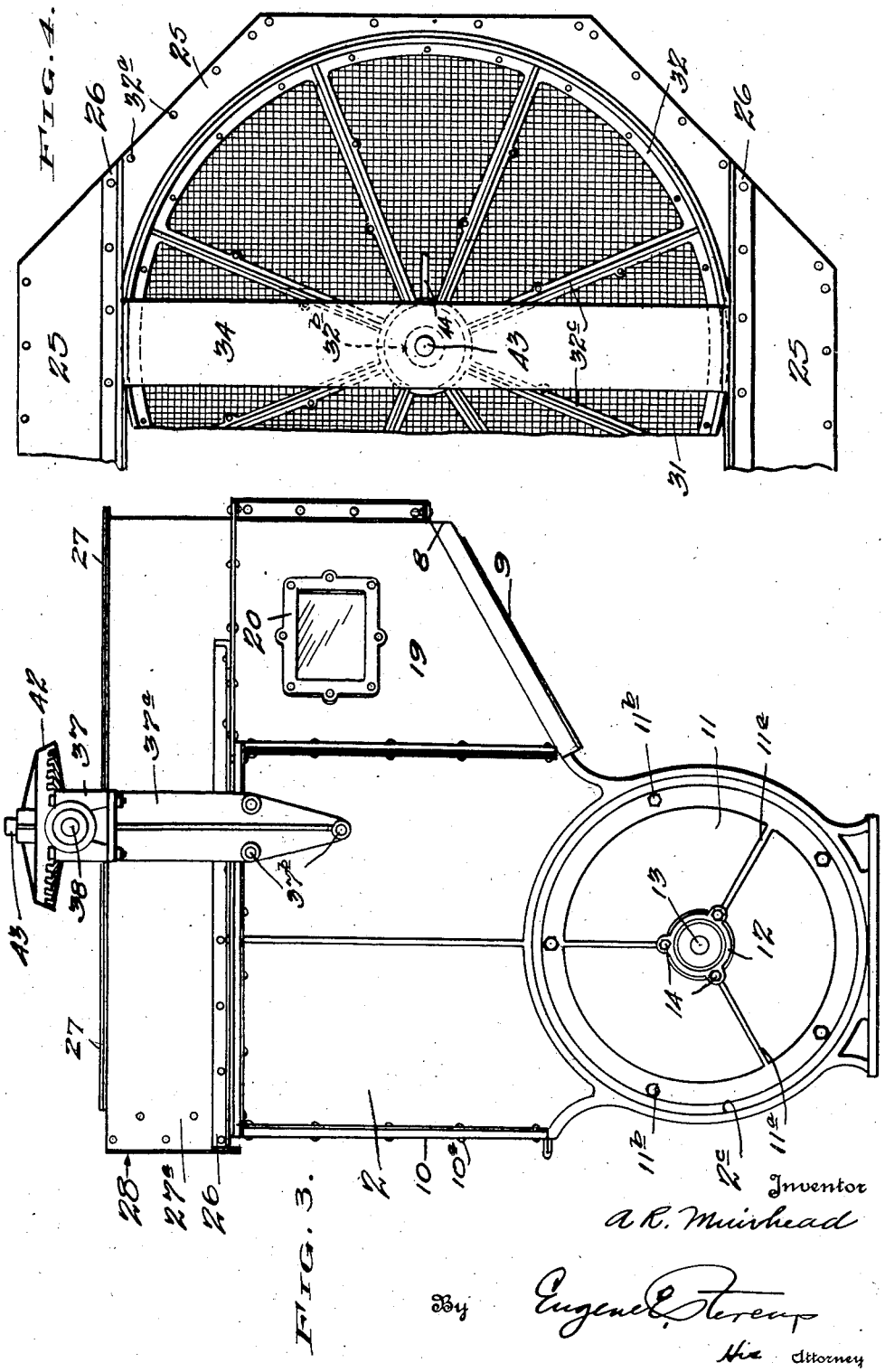

April 7, 1936.  A. R. MUIRHEAD  2,036,534
COTTON HANDLING APPARATUS
Filed Oct. 8, 1930  3 Sheets-Sheet 3
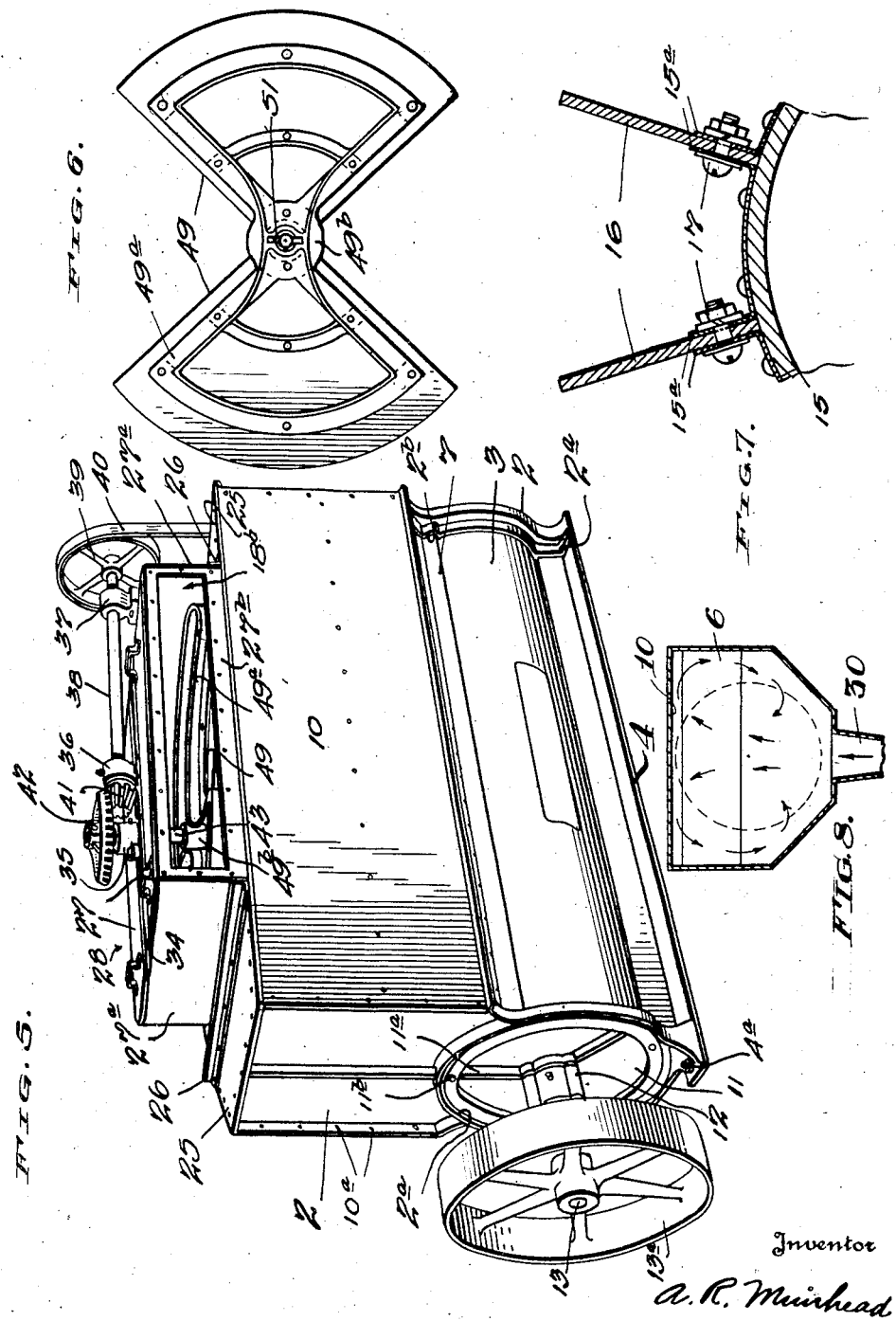
Inventor
A. R. Muirhead
By Eugene L. Stevens
His Attorney Patented Apr. 7, 1936

2,036,534

UNITED STATES PATENT OFFICE 2,036,534

COTTON HANDLING APPARATUS

Alfred R. Muirhead, Columbus, Ga., assignor to Lummus Cotton Gin Company, Columbus, Ga., a corporation of Georgia Application October 8, 1930, Serial No. 487,289

26 Claims. (Cl. 19—75)

My invention relates to improvements in apparatus for handling cotton and the like and has particular reference to a device as characterized which is admirably suited for conveying cotton to gin feeders or distributors from pneumatic elevator systems, although capable of other applications.

Briefly stated, the invention has for one of its broad general objects to provide a device as characterized which incorporates material discharge means, and means for automatically regulating the inflow of material to the device according to the varying load on said discharge means so as to prevent the latter from becoming overloaded and obviating clogging or damage to moving parts.

More specifically, it is an object of the invention to provide means for regulating the velocity of air passage in a pneumatic elevator system so as to prevent overloading of the supply means which feeds the gin feeders or distributor from such system.

Another object of the invention is to provide a device, which may be readily incorporated in a pneumatic conveyor system, for extracting cotton or the like from the air and feeding the same to the gin or distributor, the device including a screen or grating and damper means acting upon the screen or grating for regulating the passage of air therethrough so as to prevent overloading of the device with cotton or other material.

Another object of the invention is to provide in a device as characterized, regulatable means for controlling the accumulation of cotton upon the surface of said screen adjacent the pneumatic elevator inlet whereby the velocity of material flow through said elevator and into the device may be varied at will.

Another object of the invention is to provide a cotton separator for pneumatic elevator systems, and which incorporates means for ejecting the cotton for passage to the distributor or cotton gin feeders, said ejecting means incorporating a vacuum sealing element, an automatic means for controlling the inflow of cotton from the elevator through the separator in proportion to the ability of the ejecting means to remove the cotton whereby to prevent overloading of the ejecting means.

Another object of the invention is to provide a device as characterized, which will assure of a substantially uniform supply of cotton to the distributor or gin feeder whereby to greatly facilitate and expedite the ginning of the cotton to the end that a better sample may be produced.

A still further object of the invention is to furnish a novel combined damper and screen or grating wiper whereby accumulations of material may be removed therefrom and the velocity of air travel in a pneumatic conveyor or the like controlled.

The invention also resides in certain novel features of construction, combination and arrangement of the various parts, and in certain modes of operation, all of which will be readily apparent to those skilled in the art from an inspection of the accompanying drawings in connection with the following detailed descriptive matter.

It is to be understood that the drawings and description depict what is now regarded as a preferred mechanical expression of the invention, but it will be evident that the same is capable of other expressions within the spirit and scope of the subject matter claimed hereinafter.

In the drawings, wherein the same reference characters have been used to designate the same parts in all views, Figure 1 is a cross sectional view illustrating a machine incorporating my invention;

Figure 2 is a front perspective view showing the nose-like pneumatic elevator inlet;

Figure 3 is an end elevational view with the pulleys removed;

Figure 4 is a fragmentary top plan view with the damper and gearing removed to better illustrate the screen and spider which is supported upon the top plate;

Figure 5 is a rear perspective view of the machine;

Figure 6 is a top plan view of the damper;

Figure 7 is a fragmentary sectional view showing a portion of the wheel or ejector acting as a vacuum seal with its flexible vanes, and Figure 8 is a diagrammatic view looking down on the air blast-receiving chamber and illustrating how the action of the baffle 10 on the incoming air blast causes currents to be set up in opposite directions toward the ends of the casing whereby to effect uniform distribution of the material dropped out of the air blast upon the ejector wheel 15 in the inlet 6.

Referring specifically to the drawings, and particularly to Figures 3 and 5, the machine is provided with end castings 2 having circumferential shouldered seats 2c about holes in their lower portions. The castings 2 are connected at their lower portions by arcual plates 3.

As clearly indicated in Figure 1, the elongated plates 3 of arcual cross section are suitably secured to inner face flanges 2a of the castings 2 which further serve to connect the angle base beams 4 to such end castings or plates 2.

It will be evident that the open ended chamber 5 thus provided, will have the bottom discharge outlet 6, as shown, and the top inlet, both of which are coextensive with the length of the machine.

Still referring to Figure 1 it will be noted that the upper ends of the plates 3 are bent laterally and upwardly at an angle of say 30°, as indicated at 3a, 3b, the said plates being supported at their bends or angles by the longitudinal angle beams 7, which seat in countersunk portions 2b of the inner face flanges 2a of the end castings.

The ends of the plate portions 3a, 3b will be suitably beaded over and riveted as shown, the plate portion 3b being connected to the rear wall 10 of the machine while the plate portion 3a will be connected to the sloping wall 8 at the front or nose portion of the machine, it being observed that such plate end 3a also serves as a stop for the door 9 which forms a portion of the sloping wall 8 of the nose or frontal portion of the machine.

The wall 8, 9 coincides with the slope or angle of the plate wall 3a as clearly shown in Figure 1. At the rear of the machine it will be noted that there is provided a plate 8a co-extensive in length with the machine and supported by angle bars 8b, such plate being adapted to act as a chute or slide for conveying the material to the chamber 5 and also to reinforce the rear wall 10 of the machine.

It may be here pointed out that the plate 10 acts as a baffle for the incoming cotton from the inlet 30 while the steep incline of the plate 8a assures a rapid dropping of the cotton to the chamber 5. It is understood that the casing may provide a baffle otherwise than by its rear wall 10,—which however, forms a convenient baffle in the illustrated embodiment of the invention. Figure 8 illustrates the action of the baffle 10 on the cotton laden air blast.

As shown in Figures 1, 3, and 5 the open ends of the chamber 5 are closed by cast iron heads 11 having reinforcing arms or ribs 11a, and which are bolted in the shouldered seats 2c of castings 2, as indicated at 11b.

Each head or end casting 11 is provided with a bearing 12 for the shaft 13 of the ejector wheel 15 having the flexible radial vanes 16 which snugly engage the plate walls 3 forming the curved sides of the chamber 5 between its inlet and the outlet 6. The bearings 12 for the shaft 13 are bolted to the heads or end castings 11 as indicated at 14.

The wheel 15, as shown in Figures 1 and 7, will be understood to extend the full length of the chamber 5 and to make a snug contact with the inner faces of the heads 11, the vanes 16, as aforesaid, making a snug wiping contact with the walls of chamber 5. It will, presently, be evident that the entire interior of the casing will be subjected to vacuum, the sealing action of the vanes of wheel 15 preventing air to be drawn into the casing through the material discharge opening.

The flexible vanes 16, as will be observed, are secured to the periphery of the wheel in radial and rather closely spaced relationship by means of the carrier brackets 15a and the fastening elements 17.

The front or nose portion of the machine, which has already been referred to as having the bottom 8 and the bottom door 9, has its side walls 19 (see Figures 2 and 3) converging inwardly toward the inlet opening 18a which carries the inlet flue 30 of the pneumatic elevator conveyor. Windows 20 are preferably provided in the side walls 19 of the nose portion so that the inflow of cotton from the conveyor pipes 30 may be observed, and likewise the action of the damper and wiping element to be described later on.

Supported upon the upper ends of the rear wall 10, front wall 18, the nose walls 19, and the tops of the end castings 2, is the top cover plate 25 which has the transverse angle bars 26 adjacent each end and bearing against the sides 27a of the damper chamber or upper casing 28. This casing 28 is preferably formed from a sheet of metal bent in U-shaped form to provide the front and side walls, its rear outlet being provided by a cross wall 27b secured to the ends of the side walls 27a which are, of course, suitably anchored to the top of the lower casing through engagement with the angle bars 26 and in other obvious ways. The rear wall 27b of the upper or damper casing 28 provides, as shown, the elongated outlet opening adapted to receive the nipple or end of the outlet flue, such opening being indicated as at 18b in Figure 5.

Extending between the walls 27a of the top, or damper casing 28, is the channel member 34 which supports the inner edges of the removable closure doors 27 which rest upon the top of the walls 27a and substantially seal the top of the damper chamber.

The channel bar 34, with the removable closure doors 27, therefore forms the top of the chambered damper casing 28, whose bottom is defined by the top closure plate 25 of the lower casing. The top closure plate 25 of the lower casing is provided with a large central opening 25a adapted to be covered by the screen 31 which rests upon such closure plate 25 about the margin of said opening and has superimposed thereon the spider 32 having the arms 32c connecting the outer flange portion with the central hub portion providing the bearing 32b.

The top edges of the ribs or arms 32c of the spider are machined so as to lie, so far as possible, in the same plane, this being important as the arms or ribs 32c of the spider are adapted to support the rotating damper plate 49 which will be referred to shortly.

From the foregoing description taken in connection with the accompanying drawings, it will be understood that the cotton is supplied from the pneumatic conveyor to the inlet nipple 30 and is discharged against the rear wall 10 of the casing, whereupon most of the cotton is dropped upon the ejector wheel or conveyor 15 and ejected through the casing outlet 6 at the bottom. Figure 8 illustrates how the baffle 10 sets up endwise air currents so as to effect even distribution of the cotton upon ejector wheel 15 so that there will be a substantially uniform feed of cotton to the subjacent gin or feeder (not shown).

In actual practice when the machine is being overloaded by the supply of cotton from the inlet 30 considerable fiber will adhere to the under surface of the screen 31 as the air passes into the damper casing 28 for discharge through the outlet 33. Oftentimes the screen 31 will be so clogged with fiber, and other matter, that the inflow of cotton from nipple 30 is cut off altogether and the machine cannot operate until screen 31 has been cleaned.

Furthermore, overloading of the ejector wheel or drum 15 results in damage to the flexible vanes 16 through the production of an excessively large roll of cotton above such wheel as will be more fully understood as the description proceeds.

The damper means which will now be described is designed to prevent overloading of the ejector wheel 15, and to assure of a substantially uniform supply of cotton to the machine through regulation of the velocity of the air blast by control of the cotton accumulation upon the screen 31.

The channel bar 34 (Figures 1 and 5) is provided with the bearing 36 for one end of a horizontal shaft 38, whose other end is supported by the bearing 37 formed at the upper end of a bracket or arm 37a which is secured to the adjacent end wall casting 2, as indicated at 37b in Figure 3. Keyed upon the end of shaft 38 is a wheel 39 adapted to have a belt drive 40 with a pulley, see Fig. 2, on the opposite end of shaft 13 from the main drive pulley 13a.

The inner end of the shaft 38 is provided with the beveled pinion 41 meshing with the beveled gear 42 keyed upon the upper end of a shaft 43 carried in the vertical bearing 35 which is fastened to the channel bar 34.

As shown in Fig. 1, the shaft 43 has a supporting collar 43a secured thereto beneath the channel bar 34, such shaft 43 extending through the central bearing 49b of the damper spider 49a and through the subjacent damper plate 49 carried thereby, such shaft 43 further extending through the concentric hub bearing 32b of the subjacent screen spider 32. Bearing 32b is lubricated through the alemite gun fitting 44 and communicating pipe.

As clearly shown in Figure 1, the lower end of the shaft 43 has secured thereto, as at 45, the bearing hub 46 of a pair of oppositely extending wiper arms 47 having flexible wiper strips 48 secured thereto, as indicated at 48a, the wiper strips 48 being adapted to frictionally engage the under surface of the screen 31 as the damper shaft 43 rotates.

The damper is shown in Figure 6, and is seen to comprise the web 49a having the hub 49b, which web is secured to the damper plate 49. The top end of the hub 49b is provided with surface recesses 51 communicating with the hub hole and adapted to receive a cross key or pin 50 extending through the shaft 43. This construction permits the damper spider 49a to have some vertical movement on the shaft 43 so that damper plate 49 may conform itself to any irregularities in the machining of the web portions or arms 32c of the screen spider 32 upon which, as aforesaid, the damper plate 49 rests.

The operation of the machine may be summarized as follows:

The cotton is supplied to the machine as aforesaid and accumulates upon the screen 31 to a certain extent at all times, but particularly when the material is being supplied faster than the ejector wheel 15 can take it away. In order to control the accumulation of cotton upon the screen 31, the damper wiper structure 49, 48 is called into play. Obviously when the damper plates are above a certain area of the screen 31 there will be no air blast subjected thereto and consequently any material adhering to the bottom of the screen will drop off it being remembered that the ejector wheel 15 seals the outlet 6.

So long as the capacity of the ejector wheel to remove the cotton is not overreached, very little cotton adheres to the screen 31 because it will, after hitting the baffle—providing rear wall 10 (Figs. 1 and 8) fall and be evenly distributed over ejector wheel 15. As indicated, this is caused partly by the deflecting action of baffle wall 10, and partly by the baffle-created air currents as suggested in Figure 8.

It should be understood that the quantity of cotton carried into the casing by the air blast through inlet 30 will vary. In normal operation there will be intervals when more cotton is supplied to ejector wheel 15 than it can immediately carry away; and there will be other intervals when the capacity of the ejector wheel will exceed the amount of cotton supplied to it. Such surplusage of cotton received during the first-mentioned intervals will, due to rotation of ejector 15 be formed into a loose roll immediately above the ejector. So long as this roll does not become large enough to intercept and deflect the incoming cotton-laden air blast upwardly against screen 31 its presence is unobjectionable. This is so because when the quantity of cotton in the incoming air blast drops below the amount that ejector 15 can immediately dispose of,—(as it usually will before the roll becomes excessively large)—such roll or surplus will be carried out by ejector 15.

Ejector wheel 15 will be driven at such a speed as to take care of usual fluctuations in the rate of flow of the cotton into the machine and thus the formation thereabove of a roll of cotton sufficiently large to deflect upwardly the incoming air blast will ordinarily be prevented.

However, should the supply of cotton exceed the capacity of ejector 15 for an extended period of time, an excessively large roll of cotton will be formed above ejector 15. A roll that would extend above the upper end of plate 8a (Fig. 1) to obstruct baffle 10 would be "excessively large" and would deflect the incoming cotton-laden air blast upwardly against screen 31. This would prevent cotton from being dropped out of air blast onto ejector 15. Instead the cotton would catch on screen 31 and the upwardly deflected air blast caused by such excessively large roll would very largely prevent the disengagement of such cotton from the screen by the hereinbefore described concerted operation of damper 49 and wiper 47. Obviously, this excessive accumulation of cotton on screen 31 substantially cuts off passage of air therethrough. As a consequence the velocity of air entering the machine is reduced and with it the cotton supply to the casing. This gives the ejector wheel 15 an opportunity to dispose of the excessively large roll of cotton. When the size of such roll of cotton above ejector 15 has been reduced so as to expose baffle 10 to the air blast the damper 49 and wiper 47 will have cleaned screen 31 and the machine will commence functioning again as usual. By this construction, damage to the machine as a result of overloading is automatically prevented.

Since there is no air current to hold the cotton to the portion of screen 31 which happens to be beneath the slowly rotating damper 49, it is free to drop down and such as may still adhere to the screen will be wiped off by the flexible wiper 48 which rotates with and beneath the damper plates 49 in close contact with the under surface of the screen 31. Thus, a newly cleaned screen surface is being constantly presented to the incoming air and cotton.

Overloading of the ejector wheel is prevented by regulation of speed of the damper so that the amount of clean draft passage surface of screen 31 that will be exposed to the incoming cotton, or air, under maximum load conditions in the inlet pipe 30, will be very limited. In this way I reduce the flow velocity in the pneumatic conveyor and prevent the supply of incoming cotton from exceeding the capacity of the ejector wheel 15.

When the ejector wheel or conveyor has removed the surplus cotton from the machine one revolution of the damper shaft serves to completely clear the screen of adhering cotton and the full strength of suction is again available until another overload has been reached.

Figure 1 illustrates the top and bottom walls of the conveyor pipe 30 as converging toward one another in the direction of the outlet into the casing so as to concentrate the air-blast against that portion of the rear baffle providing wall 10 of the casing as is above the inclined plate 8a and below the wiper 47. As indicated in Figure 1, but better illustrated in Figures 2 and 8 said conveyor pipe 30 is preferably flared slightly laterally at its discharge end so that while confining the discharge of material to a limited intermediate area of baffle 10 there will be more definitely and effectively set up the lateral air currents indicated in Figure 8 as an aid in distributing the material lengthwise of the ejector wheel 15.

Having thus described my invention, what I claim as new and desire to secure by Letters Patent is:

1. The combination with a pneumatic conveyor system; of a material collecting casing having an inlet and separate air and material outlets, said casing providing a baffle opposite said inlet and disposed substantially perpendicular to said outlets, a material catching member interposed between said outlets, a continuously movable damper member associated with said material-catching member, and ejector conveyor means in said material outlet, said means sealing the outlet.

2. A material extracting device for a pneumatic conveyor comprising a material collecting casing having an inlet and separate air and material outlets, a material catching member interposed between said separate outlets, a continuously movable damper member associated with said material-catching member, and material ejecting means in said material outlet.

3. The combination with a pneumatic conveyor system; of a material collecting casing having an inlet and separate air and material outlets, a material catching member interposed between said separate outlets, and a movable damper member adjacent said material catching member and on the air outlet side thereof, said damper member being movable in a plane parallel to said material catching member.

4. The combination with a pneumatic conveyor system; of a material collecting casing having an inlet and separate air and material outlets, a material catching member interposed between said separate outlets, and a movable damper member adjacent said material catching member and on the air outlet side thereof, said damper member being movable over different areas of said material catching member.

5. The combination with a pneumatic conveyor system; of a material collecting casing having an inlet and separate air and material outlets, said casing providing a baffle opposite said inlet and disposed substantially perpendicular to said outlets, a material catching member interposed between said outlets, and a damper member adjacent said material catching member and movable in a plane parallel thereto, said damper being smaller in area than said material catching member and movable to obstruct air draft through different areas of said member.

6. The combination with a pneumatic conveyor system; of a material collecting casing having an inlet and separate air and material outlets, a material catching member interposed between said separate outlets, a movable damper member adjacent said material catching member and on the air outlet side thereof, and means at the other side of said catching member and movable with the damper member for removing material therefrom.

7. The combination with a pneumatic conveyor system; of a material collecting casing having an inlet and separate air and material outlets, a material catching member interposed between said separate outlets, a movable damper member adjacent said material catching member and on the air outlet side thereof, mechanical means for removing material from said catching member, and said mechanical means being connected to and movable with said damper and disposed at the opposite side of said catching member from said damper.

8. The combination with a pneumatic conveyor system; of a material collecting casing having an inlet and separate air and material outlets, a material catching member interposed between said separate outlets, a continuously movable damper member adjacent said material catching member and on the air outlet side thereof, and material ejecting means in said material outlet.

9. The combination with a pneumatic conveyor system; of a material collecting casing having an inlet and separate air and material outlets, said casing providing a baffle opposite said inlet and disposed substantially perpendicular to said outlets, a material catching member interposed between said outlets, and a damper member adjacent said material catching member and movable in a plane parallel thereto, said damper being smaller in area than said material catching member, and movable to obstruct air draft through different areas of said member, and an ejector conveyor means disposed in and sealing said material outlet for accelerating the dropping of material.

10. The combination with a pneumatic conveyor system; of a material collecting casing having an inlet and separate air and material outlets, a material catching member interposed between said separate outlets, a movable damper member adjacent said material catching member and on the air outlet side thereof, mechanical means for removing material from said catching member, said mechanical means being connected to and movable with said damper and disposed at the opposite side of said catching member from said damper, and an ejecting means disposed in and sealing said material outlet.

11. The combination with a pneumatic conveyor system; of a material collecting casing having an inlet and separate air and material outlets, a material catching member interposed between said separate outlets, a movable damper member adjacent said material catching member and on the air outlet side thereof, mechanical means for removing material from said catching member, said mechanical means being operatively connected to said damper and disposed at the opposite side of said catching member from said damper, an ejecting means disposed in and sealing said material outlet, and said casing providing a baffle wall opposite said inlet and disposed rearwardly of said outlets at the material outlet side of said material catching member.

12. A device for the purpose specified comprising a casing having an inlet and separate air and material outlets, a screen-like member dividing said casing horizontally into two chambers, said inlet and material outlet opening into said lower chamber and said air outlet leading from said upper chamber, a driven ejector conveyor member in said lower chamber and adjacent the outlet thereof, said member sealing the outlet, and a damper element in said upper chamber and movable in a plane parallel with and adjacent to said screen.

13. A device for the purpose specified comprising a casing having an inlet and separate air and material outlets, a screen-like member dividing said casing horizontally into two chambers, said inlet and material outlet opening into said lower chamber and said air outlet leading from said upper chamber, a driven ejector conveyor member in said lower chamber and adjacent the outlet thereof, said member sealing the outlet, a web member superimposed upon said screen-like member, and a rotatably driven damper member smaller in area than said screen and supported upon said web member.

14. A device for the purpose specified comprising a casing having an inlet and separate air and material outlets, a screen-like member dividing said casing horizontally into two chambers, said inlet and material outlet opening into said lower chamber and said air outlet leading from said upper chamber, a driven ejector conveyor member in said lower chamber and adjacent the outlet thereof, said member sealing the outlet, a web member superimposed upon said screen-like member, a rotatably driven damper member smaller in area than said screen and supported upon said web member, said damper member having a shaft extending below said screen, and a wiper element carried by said shaft below said screen beneath said damper member for removing material from the screen.

15. A material extracting device for a pneumatic conveyor comprising a material collecting casing having an inlet and separate air and material outlets, a material catching member rigidly fixed in said casing and arranged to exclude material from said air outlet, said casing providing a baffle wall opposite said inlet and substantially perpendicular to the axis of said inlet, said baffle wall being superjacent to said material outlet, and a damper adjacent to said material catching member and movable substantially in plane therewith.

16. A material extracting device for a pneumatic conveyor comprising a casing providing an elongated chamber having separate air and material outlets, the material outlet being in its bottom and occupying the major portion of the length of the chamber, a minor intermediate area of the lineal front wall of said chamber providing an inlet thereinto for a material laden air-blast, and said front wall having angled portions diverging from the inlet, said inlet being above and intermediate the ends of said material outlet, and means for effecting distribution of material from the air-blast substantially evenly throughout the length of said outlet and comprising a baffle provided by the rear wall of said chamber, said baffle-providing rear wall being arranged in spaced opposition to said inlet.

17. In a device of the class described having a pneumatic conveyor inlet, material discharge means, air exhaust means, a screen over the inlet to said air exhaust means, a movable damper disposed outwardly of said screen, means superimposed upon said screen and providing means for dividing the same into separate areas, and said damper working over and upon said last named means.

18. In a device of the class described, a material collecting casing having an inlet and separate air and material outlets, a material catching member interposed between said separate outlets, the back of said material catching member having a rearwardly extending supporting means, and a damper member movable in plane with said screen and bearing against said supporting means whereby to be spaced from said screen.

19. In an apparatus for separating suspended material from an air stream, a screen across the air stream, a damper continuously movable across the air stream adjacent the screen, and spaced partition members extending between said screen and damper.

20. In an apparatus for separating suspended material from an air stream, a screen, a damper adjacent the screen and movable in a plane parallel thereto, partition members extending from the screen to the plane of the damper, said partition members being spaced apart a distance less than the width of the damper.

21. The combination with a pneumatic conveyor system, of a material collecting casing having a combined air and material inlet and separate air and material outlets, a screen between said separate outlets, and means continuously movable over the outlet side of the screen whereby successively to block off different sections of said screen against air passage therethrough.

22. The combination with a pneumatic conveyor system, of a material collecting casing having a combined air and material inlet and separate outlets for air and material, a screen disposed between said inlet and the air outlet, a member disposed on the outlet side of said screen in spaced relation therefrom for blocking off suction over a portion of the screen surface, and means for continuously moving said member in a manner to block off suction successively over different portions of the screen surface.

23. The method of separating cotton from air which consists in moving a body of cotton into engagement with the entire surface of one side of a screen by suction exerted from the opposite side, and simultaneously interrupting the suction over defined areas of the screen less than its total surface in alternation.

24. The method of separating cotton from air which consists in moving a body of cotton into engagement with and over the entire surface of one side of a screen by suction exerted from the opposite side, and during the movement of the cotton simultaneously interrupting the suction over defined areas of the screen less than its total surface in alternation.

25. The method of separating cotton from air which consists in continuously drawing cotton into a chamber by suction created on one side of a screen confining in its totality a portion of said chamber, intermittently interrupting the suction over defined areas of said screen less than its total surface in alternation and continuously discharging deposited cotton from said chamber.

26. The method of separating cotton from air which consists in continuously drawing cotton into a chamber by suction created on one side of a screen confining in its totality a portion of said chamber, intermittently interrupting the suction over defined areas of said screen less than its total surface in alternation, and continuously discharging deposited cotton from said chamber without impairing the force of suction effective to draw the cotton into said chamber.

ALFRED R. MUIRHEAD.